US008861666B2

(12) United States Patent
Ng

(10) Patent No.: US 8,861,666 B2
(45) Date of Patent: *Oct. 14, 2014

(54) COMMUNICATION PROTOCOL METHOD AND APPARATUS FOR A SINGLE WIRE DEVICE

(75) Inventor: Philip S. Ng, Cupertino, CA (US)

(73) Assignee: ATMEL Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,543

(22) Filed: Dec. 27, 2011

(65) Prior Publication Data

US 2012/0099662 A1     Apr. 26, 2012

Related U.S. Application Data

(62) Division of application No. 13/009,716, filed on Jan. 19, 2011, now Pat. No. 8,107,577, which is a division of application No. 11/618,542, filed on Dec. 29, 2006, now Pat. No. 7,881,415.

(51) Int. Cl.
*H04L 7/06* (2006.01)
*H03L 7/00* (2006.01)
*H03H 11/26* (2006.01)

(52) U.S. Cl.
USPC ............................. 375/364; 327/160; 327/161

(58) Field of Classification Search
CPC ... H04L 7/0033; H04L 7/0037; H04L 7/0041; H04L 7/0045; H04L 7/02; H04L 7/027; H04L 7/04; H04L 2007/04
USPC .......... 375/359, 364, 371; 327/141, 142, 144, 327/151–153, 160, 161; 713/400, 401, 500, 713/502
See application file for complete search history.

(56) References Cited

U.S. PATENT DOCUMENTS

| 4,535,025 A | 8/1985 | Jabarin |
| 4,719,375 A | 1/1988 | Martin |
| 4,910,692 A | 3/1990 | Outram et al. |
| 4,958,243 A | 9/1990 | Chen et al. |
| 5,557,781 A | 9/1996 | Stones et al. |
| 5,559,752 A * | 9/1996 | Stephens et al. ........... 365/233.1 |
| 5,570,085 A | 10/1996 | Bertsch |
| 5,842,032 A | 11/1998 | Bertsch |
| 5,903,594 A | 5/1999 | Saulnier et al. |
| 5,938,757 A | 8/1999 | Bertsch |

(Continued)

FOREIGN PATENT DOCUMENTS

JP          07245622         9/1995

*Primary Examiner* — Young T. Tse
(74) *Attorney, Agent, or Firm* — Fish & Richardson P.C.

(57) ABSTRACT

The present invention is a noise tolerant communication protocol device and method where a clock signal input, triggers an internal delay clock in an integrated circuit. Data is presented to an input pin and sampled prior to the next external clock pulse based on the internal delay clock. A data pulse value is distinguished by input signal voltage level and not by pulse length. Sampling of data bits is deferred until a signal level is most likely stable, thereby avoiding sampling during periods around edges of changing data values. Therefore, error detection and correction circuitry is not required. A time reference pulse, produced by a bus master, is measured by the protocol device, in determine a data transmission rate by the master. The timing of sampling of input signaling from the master is determined by the protocol, device from measurement of the time reference pulse magnitude.

12 Claims, 14 Drawing Sheets

(56) References Cited

U.S. PATENT DOCUMENTS

| | | |
|---|---|---|
| 6,112,275 A | 8/2000 | Curry et al. |
| 6,154,870 A | 11/2000 | Fredrickson et al. |
| 6,275,922 B1 | 8/2001 | Bertsch |
| 6,373,312 B1 * | 4/2002 | Barnes et al. ............ 327/261 |
| 6,384,723 B1 | 5/2002 | Keeler et al. |
| 6,498,563 B1 | 12/2002 | Tice |
| 6,972,998 B1 | 12/2005 | Gibson et al. |
| 2008/0159432 A1 | 7/2008 | Ng |

* cited by examiner

COMMUNICATION PROTOCOL METHOD AND APPARATUS FOR A SINGLE WIRE DEVICE

RELATED APPLICATION

This application is a divisional of U.S. patent application Ser. No. 13/009,716, filed Jan. 19, 2011, now U.S. Pat. No. 8,107,577, issued on Jan. 31, 2012, which is a divisional of U.S. patent application Ser. No. 11/618,542, filed Dec. 29, 2006, now U.S. Pat. No. 7,881,415, issued Feb. 1, 2011, which are incorporated herein by reference in their entirety.

TECHNICAL FIELD

The present invention relates generally to an apparatus and method for communication protocols. More specifically, the present invention pertains to an apparatus and method for implementing a communication protocol transmitted over a single wire.

BACKGROUND ART

Serial memory devices typically have a single input clock pin and a single input/output (I/O) pin for providing data. Although there are many product specific and proprietary protocols for accessing such devices, many industry standards are known and in the public domain.

Communications of data and clock information frequently occurs via a single-wire form of transfer. Such communications are often used in memory chip transfers (e.g., between flash memory, EEPROMs, etc.) Some prior art schemes use a pulse width of the data to define the protocol. For example, the duration of a "1" data pulse is longer than a duration of a "0" data pulse. FIG. 1A shows an ideal output utilizing a pulse width modulation protocol. A first pulse 101 is indicative of a "0" (or logic low) transmission while a second-pulse 103 is indicative of a "1" (or logic high) transmission.

A problem with this pulse width protocol is that noise can affect it in such a way that it becomes difficult to determine the duration of the data pulse. Consequently, errors occur in reading the data pulses. FIG. 1B shows an example of a typical prior art transmission signal with noise. A first pulse 105 is indicative of a "0" transmission. However, a second pulse train 107 and a third pulse train 109 cannot be clearly discerned due to excessive noise. Indeed, the second and third pulse trains 107 and 109 each contain a plurality of data pulses, although an exact number of pulses is unknown.

Error detection and correction circuits are generally used with protocols of this type to alleviate the inaccuracies in reading the data. However, these error detection/correction circuits take up valuable real estate on an integrated circuit chip. Therefore, it is not desirable to use pulse width modulation protocols and rely on error correction techniques to accurately transmit clock and data over a single wire.

What is needed is a high speed read access in a serial, single wire transmission which can be achieved without excessive circuitry and/or cost. It is a further desire to provide such capability without excessive power requirements.

SUMMARY

The present invention solves the aforementioned problems by providing noise tolerant communication protocol in which a delay clock is created internally in an integrated circuit when all input signal transitions from logic high to logic low in one embodiment, this could be the falling edge of an external clock signal. During a predefined delay time, data can be presented to an input pin and can be sampled prior to the next external clock pulse. The protocol does not rely on the length of the data pulse to determine a value of the data (i.e., whether data is a "1" or "0"). Rather, "0's" and "1's" are distinguished by a voltage level of the signal. Sampling of data bits is deferred until that signal level is likely to be stable thereby avoiding sampling during periods around rising or falling edges associated with changing data values. Therefore, noise should not affect reading of the data and error detection and correction circuitry is not required.

In one embodiment of the present invention, one bit of data is sampled per external clock cycle. This embodiment encompasses both a device and a method for its use. The electronic device samples an external clock pulse and a data bit from a single wire communication system through a data input terminal. A pulse generator produces a pulse whenever an external clock pulse is input. A first delay element coupled to the poise generator produces a delayed pulse. Together, the pulse generator and the first delay element form a portion of an internal clock used for timing various functions within the device. Input data bits are latched in and output data are valid only during a stable portion of each data bit. The latch, for example, a D-type flip-flop, is enabled by the internal clock. A second delay element produces a delay between the input data input terminal and the latch. The second delay ensures that the external clock pulse is prevented from reaching the latch while the latch is enabled.

In another embodiment of the present invention, a plurality of data bits is sampled per external clock cycle. This embodiment also encompasses both a device and a method for its use. The electronic device samples an external clock pulse and data bits from a single wire communication system, through a data input terminal. A pulse generator produces a pulse whenever an external clock pulse is input. A first delay element is coupled to the pulse generator for producing a delayed pulse. Together, the first pulse generator and the first delay element form a portion of an internal clock. A first latch, for example, an SR latch, is used to enable the first pulse generator during a period of time when the external clock pulse is present on the single wire input. The external clock then serves as a trigger for the first pulse generator. A second latch, for example, a D-type flip-flop, is enabled by the internal clock for latching each of the data bits and producing an output. The second latch is enabled only during a period of time when the data bits are stable. A counter, for example, a count-by-n counter, is used for determining when all data bits within a given cycle have been latched. The counter then resets the device in preparation for a subsequent serial communication cycle.

DETAILED DESCRIPTION

Figure 1A:
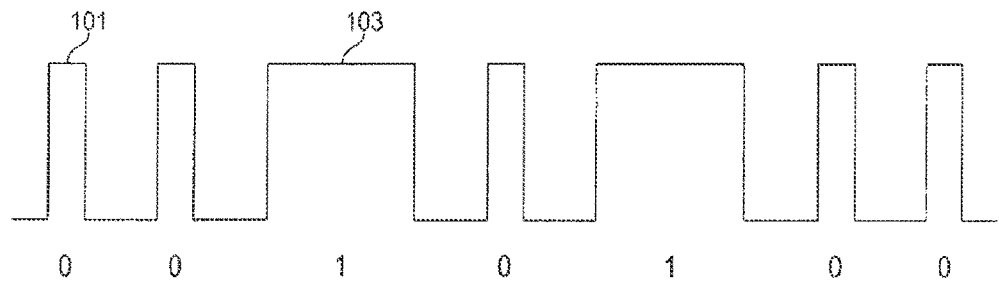
FIG. 1A is an ideal pulse train of the prior art employing pulse width modulation to distinguish logic high and logic low data states.
Figure 1B:
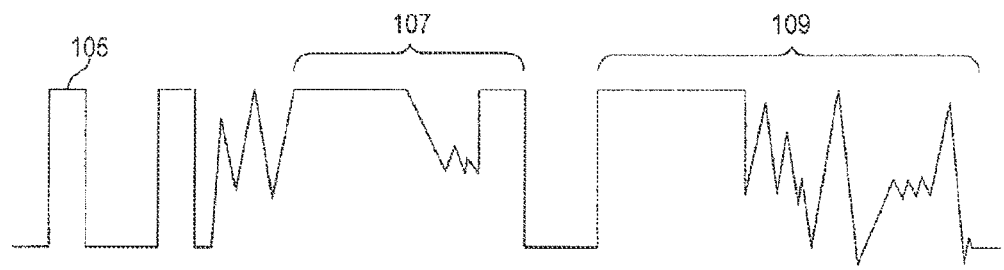
FIG. 1B is a simulated actual pulse train with noise employing pulse width modulation of the prior art to distinguish logic high and logic low data states.
Figure 2:
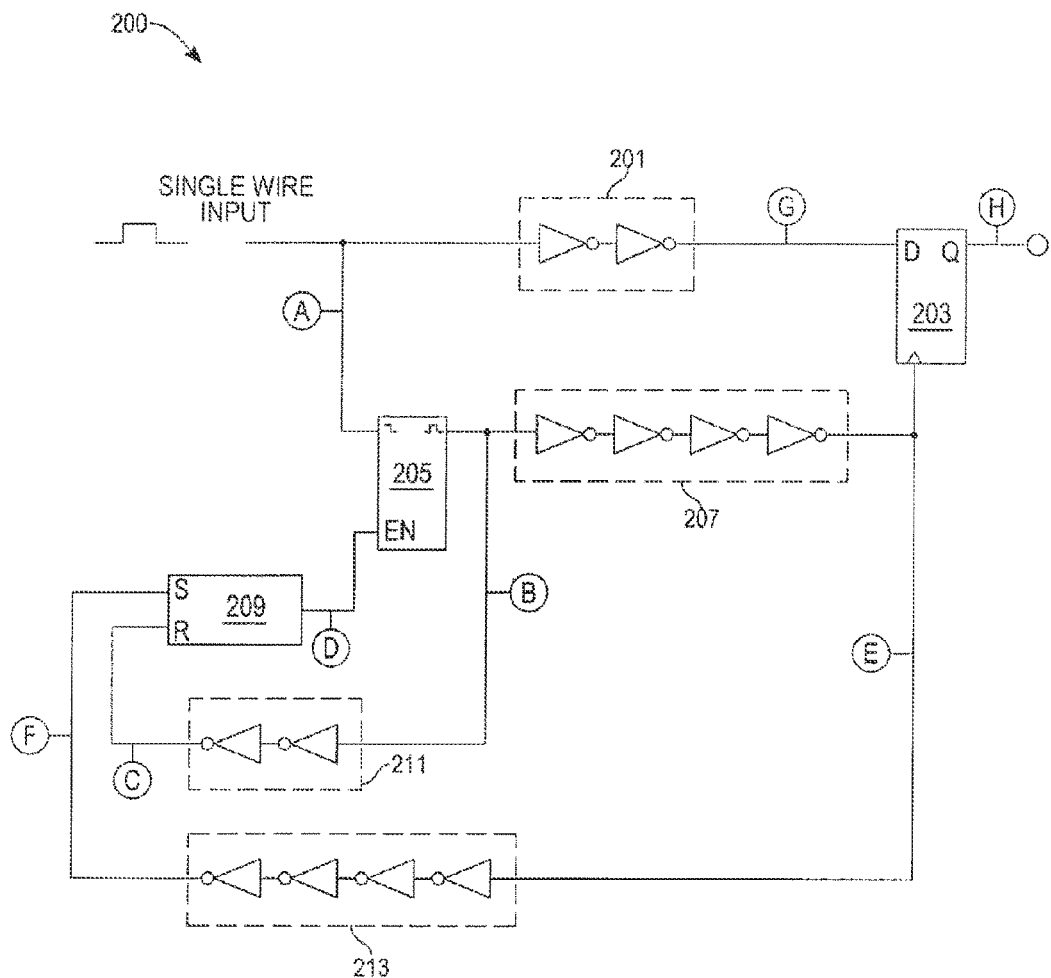
FIG. 2 is an exemplary schematic circuit diagram of a single-bit implementation of the present invention to provide a communication protocol from over a single wire.

With reference to FIG. 2, an exemplary embodiment of a single-bit noise resistant circuit 200 is shown. The single-bit noise reduction circuit 200 includes a first delay element 201, a D-type flip-flop 203, a single-pulse generator 205, a second delay element 207, an SR-type latch 209, a third delay element 211, and a fourth delay element 213.

As shown in this exemplary embodiment, a combination external clock and data pulse train enters the single-bit noise resistant circuit 200 at a single wire input and is concurrently fed into an input of the single-pulse generator 205 and the first delay element 201. Assuming the SR latch 209 is in a "set" position, a failing edge of an incoming external clock pulse produces a pulse at an output of the single-pulse generator 205. The pulse produced at the output of the pulse generator 205 starts an internal clock and follows two paths. First, the pulse propagates through the third delay element 211, thereby forcing the SR latch 209 into a reset position. Secondly, the pulse propagates through the second delay element 207, and is again split, reducing an enable pulse for the D-type flip-flop 203, and concurrently propagating through the fourth delay element 213. Once the pulse has propagated through the fourth delay element 213, the SR latch 209 is placed back in a "set" state. However, the third delay element 211 is chosen to have a propagation delay which is less than the total propagation delay of the second and the fourth delay elements 207, 213 combined. This difference in delay creates a window in time during which only data is gathered from the incoming clock and data pulse train. The second delay element 207 is chosen to enable the flip-flop 203 only when a data pulse is present, thereby excluding external clock pulses from appearing at an output of the flip-flop 203. The clock pulse is not latched as part of an output pulse from the single-bit noise resistant circuit as described infra with regard to a single-bit protocol timing diagram. Letters "A"-"E" serve as references for a timing diagram of FIG. 3.

Figure 3:
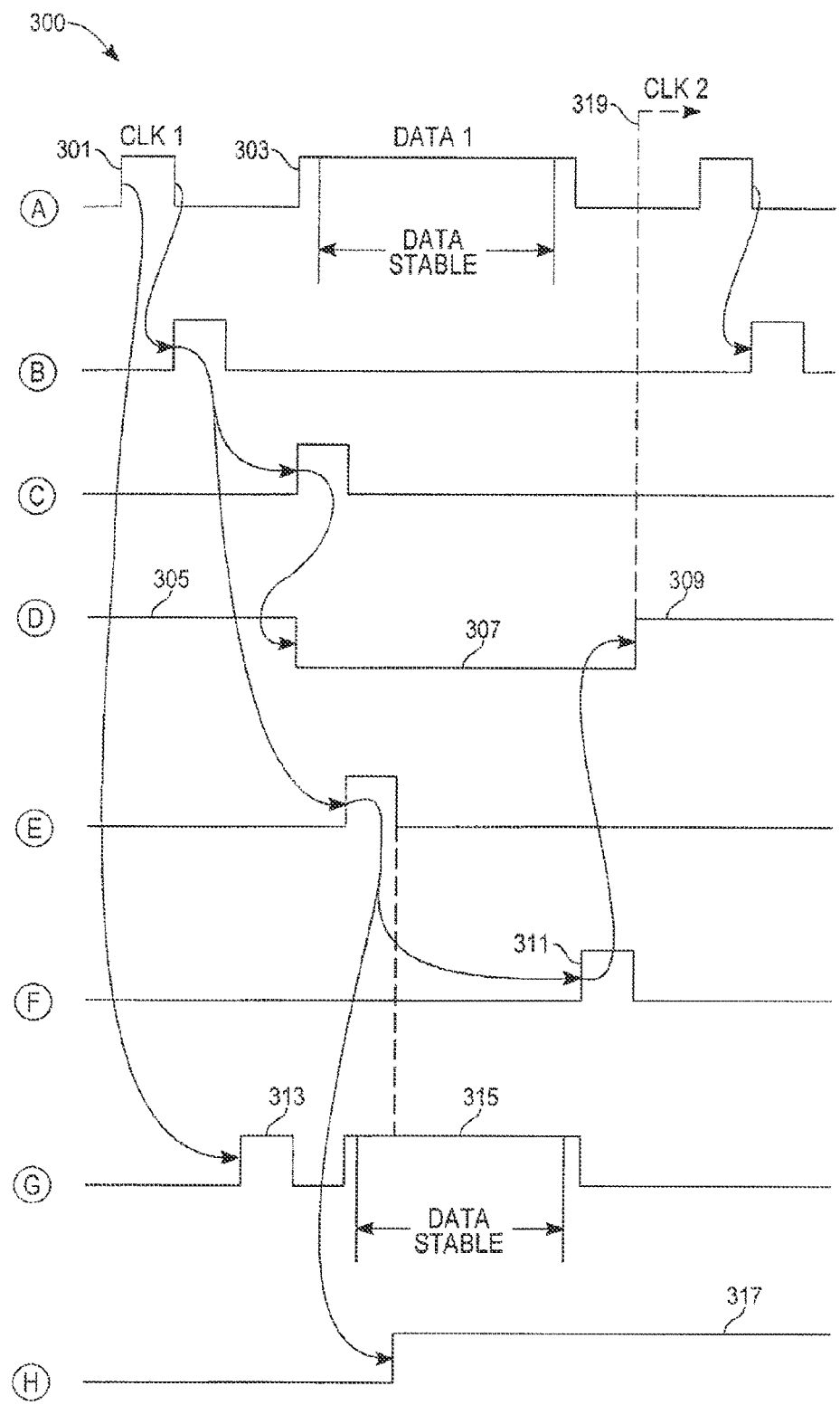
FIG. 3 is a timing diagram of the circuit of FIG. 2.

FIG. 3 shows an exemplary single-bit protocol timing diagram 300 for the single-bit circuit 200 of FIG. 2. The timing diagram 300 comprises the constituent timing diagram of each significant input and output of the single-bit noise resistant system 200 of FIG. 2. (Note that each line of the timing diagram "A"-"E" references a particular point in the circuit 200). A constituent timing diagram changes state only when an event represented by another constituent event occurs. The timing diagram includes an initial clock pulse 301, an initial data pulse 303 (or lack of a pulse for a "0" data value), a single-pulse generator enable signal 305, a 31) single-pulse generator disable period 307, a single-pulse generator re- enable signal 309, an SR latch set pulse 311 (prior to propagation through the delay element 213), a delayed initial clock pulse 313, a delayed initial data pulse 315, a non-inverted latched output 317, and a start of a subsequent clock cycle 319. The initial data pulse 303 is shown at a high (i.e., "1") logic level for aid in understanding the timing diagram 300. However, one skilled in the art will recognize that a low logic data level will function appropriately.

On operation of the single-bit circuit 200, the clock/data pulse train concurrently passes to the first delay element 201 and the single-pulse generator 205. After propagation, an output from the first delay element 201 produces a delayed initial clock pulse 313 and the delayed initial data pulse 315.

A second portion of the clock/data pulse train continues as follows. Assuming the SR latch 209 is in the set position, the single-pulse generator 205 is enabled by the enable signal 305. A falling edge of the initial clock pulse 301 then forces the single-pulse generator 205 to produce an output pulse as shown at "B." After the delay incurred propagating through the third delay element 211, the pulse shown at "C" sends a reset to the SR latch 209. While the SR latch is in a reset position, an output from the SR latch 209 is forced low, thereby placing the single-pulse generator 205 into a disabled period.

The output pulse from the generator 205 also propagates through the second delay 207, enabling the D-type flip-flop 203. However, notice that the delayed clock pulse 313 occurs prior to the D-type flip-flop being enabled (at "E"). Therefore, the clock pulse is stripped from the clock/train pulse input to the single-bit circuit 200 and anon-inverted data pulse appears as the latched output 317 (at reference "H"). After an additional delay, the pulse at "E" propagates, causing the SR set pulse 311 (at reference "F"), thereby producing the pulse generator re-enable signal 309 for pulse generator 205 to be enabled for the start of a subsequent clock cycle 319. Further, the D-type flip-flop 203 is only enabled to latch to the data pulse 303 after the data pulse 303 is in a stable region (see the delayed initial data pulse 315 at "G"), thereby ensuring reliability of data latched at the output of the D-type flip-flop 203. The delay path through the fourth delay element 213 is designed to be long enough to ensure the data pulse train is not interpreted as a clock to the D-type flip-flop 203. Blocking the input data from being interpreted as an input clock is accomplished by holding "D" low 307 which disallows the data pulse from generating a clock pulse from the pulse generator 205.

Figure 4:
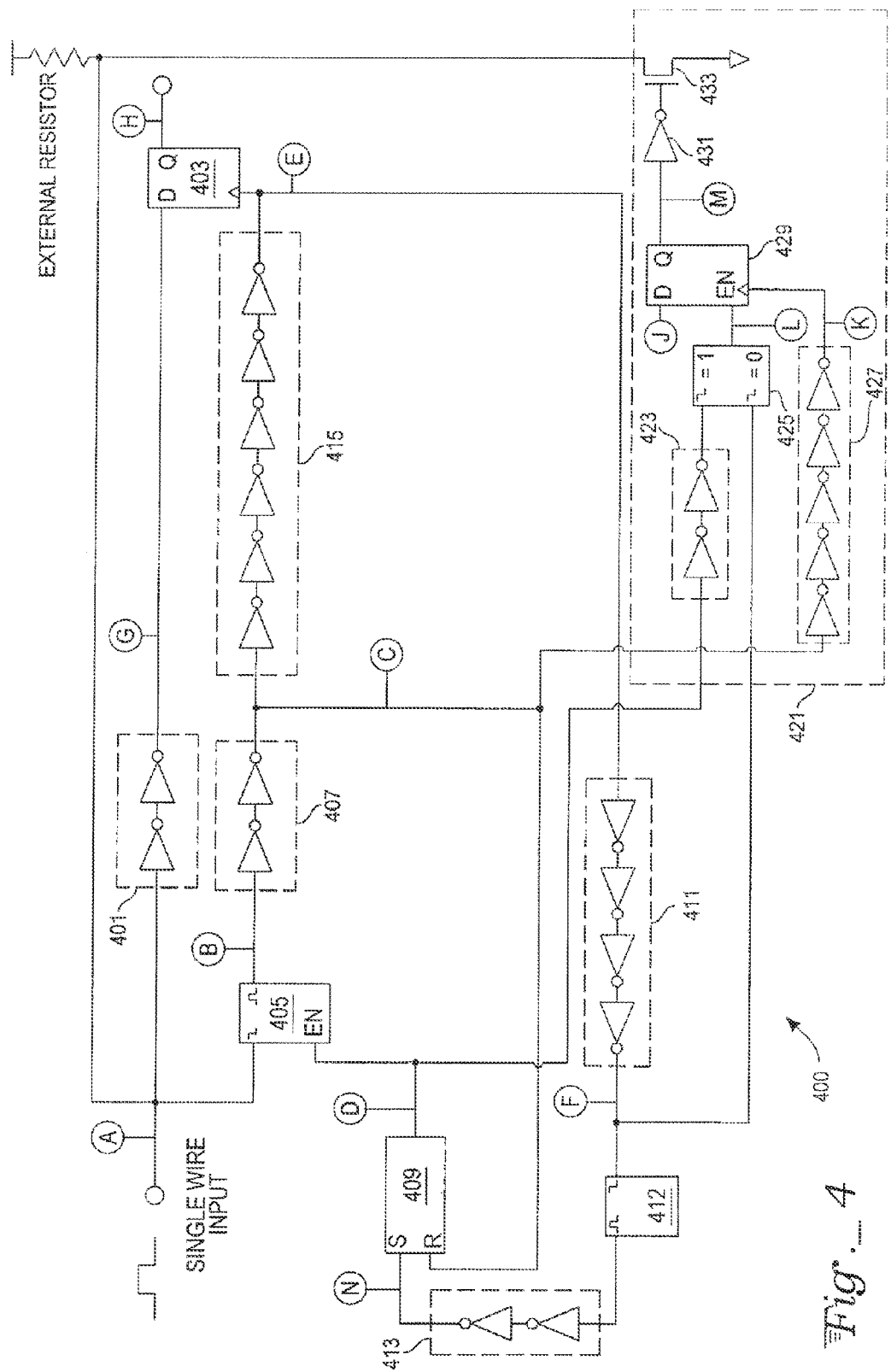
FIG. 4 is another exemplary schematic circuit diagram of a single-bit implementation of the present invention to provide a communication protocol from over a single wire.

With reference to FIG. 4, another exemplary embodiment of a single-bit noise resistant circuit 400 incorporates a single wire to output data. The single-bit noise reduction circuit 400 includes a first delay element 401, a first D-type flip-flop 403, a first single-pulse generator 405, a second delay element 407, an SR-type latch 409, a third delay element 411, a second single-pulse generator 412, a fourth delay element 413, a fifth delay element 415, and an output circuit 421.

The output circuit 421 includes a sixth delay element 423, an enable select block 425, an inverting delay element 427, a second D-type flip-flop 429, an inverter 431, and a pull-down transistor 433.

As shown in this exemplary embodiment, a combination clock and data pulse train is output to the bus. The single-bit noise resistant circuit 400 has a single wire input which is concurrently coupled to the output circuit 421, an input of the single-pulse generator 405, and the first delay element 401. Assuming the SR latch 409 is in a "set" position, a falling edge of all incoming external clock pulse produces a pulse at an output of the single-pulse generator 405. The pulse produced at the output of the pulse generator 405 starts an internal clock. The pulse propagates through the second delay element 407, and follows two paths. First, the pulse forces the SR latch 409 into a reset position. Secondly, the pulse propagates through the fifth delay element 415, and is again split, producing an enable pulse for the D-type flip-flop 403, and concurrently propagating through the third delay element 411. Once the pulse has propagated through the third delay element 411, a falling edge of the pulse triggers a second single-pulse generator 412 to produce a pulse. The pulse from the second single-pulse generator 412 propagates through the fourth delay element 413, thereafter forcing the SR latch 409 back to a "set" position.

Relative delay times for each delay element are chosen to create a window in time during which only data are gathered from the incoming clock and data pulse train. Relative delays shown are exemplary only and may be modified by methods known to a skilled artisan depending upon factors such as delay between external clock pulses, delay between external clock and data pulses, relative data pulse durations, and so on.

For general guidance, the first delay element 401 is utilized for noise reduction purposes. The second delay element 407 ensures an adequate pulse width at point "C." Otherwise, the pulse at "C" could be very narrow and be filtered at a subsequent stage. The fifth delay element 415 prevents the first flip-flop 403 from becoming enabled prior to latching a stable data portion of the data pulse and additionally preventing a clock pulse from being latched during data input situations. The fifth delay element 415 works in conjunction with the second delay element 407 and is chosen to enable the first flip-flop 403 only when a data pulse is present, thereby excluding external data In pulses or data out pulses from entering the clock pin of the first flip-flop 403. The third delay element 411 works in conjunction with the fourth delay element 413 to allow sufficient delay time for the data pulse to fully propagate so as to prevent the SR-latch from being in a "set" position (thereby ensuring that the single-pulse generator 405 is not enabled). One skilled in the art will recognize that the third and fourth delay elements 411, 413 may be combined into a single delay element depending on external clock/data pulse parameters discussed supra.

When various delays are properly selected as described, the clock pulse is not latched as part of an output pulse from the single-bit noise resistant circuit, as described infra, with regard to a single-hit protocol timing diagram. Letters "A"-"H" and "K"-"N" serve as references for a timing diagram of FIG. 5.

The output circuit 421 is configured to output data, at "J," from an internal memory, and, once latched by the second D-type flip-flop 429, to enter a main portion of the single-bit noise resistant circuit, described supra. The second inverter 431 and the second pull-down transistor 433 serve to pull the output low for outputting a logic zero. A skilled artisan will recognize that there may be ways to further simplify the logic of FIG. 4 or alternate methods to accomplish the same suggested protocol and still be within the scope of the present invention.

Figure 5:
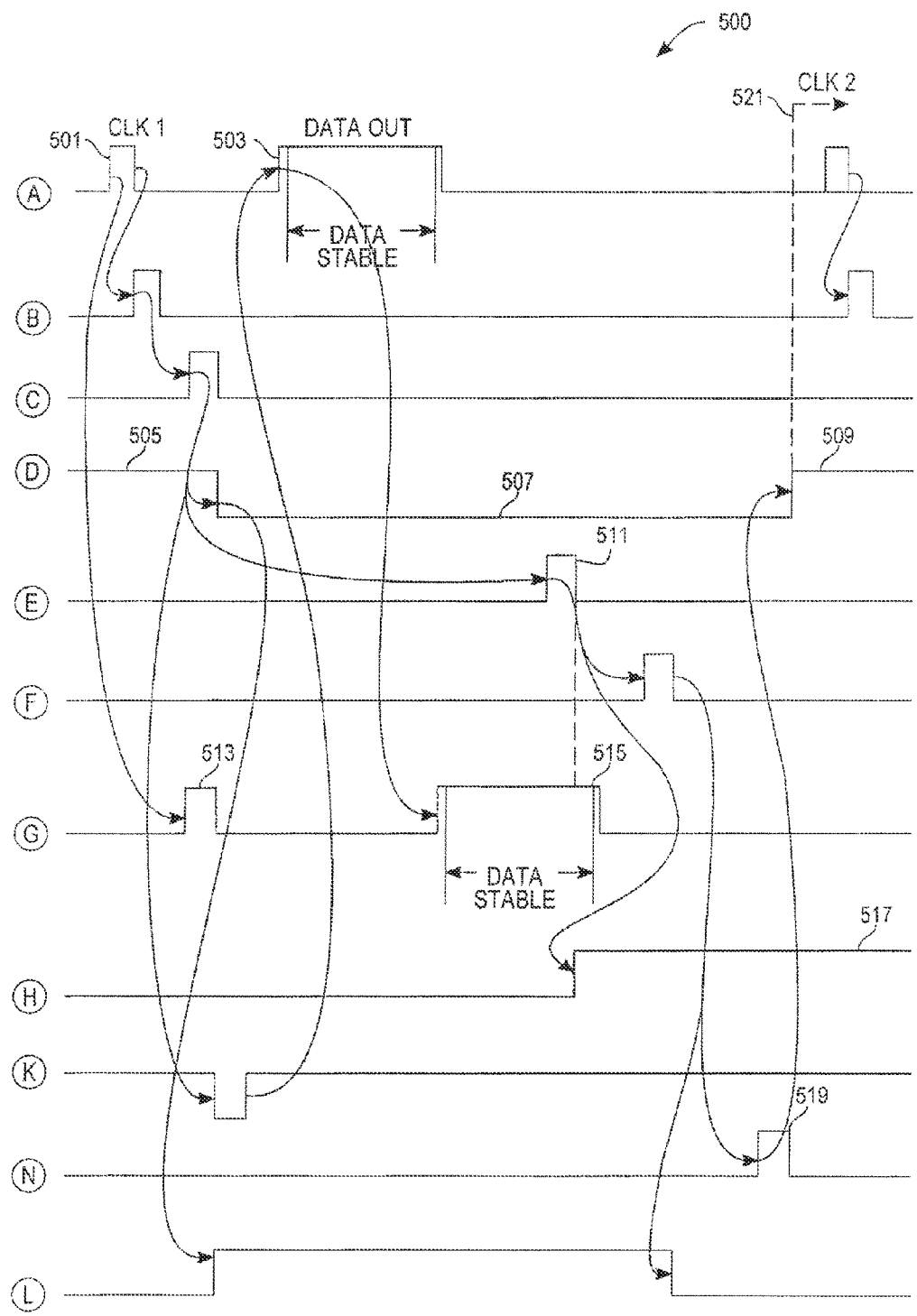
FIG. 5 is a timing diagram of the circuit of FIG. 4.

FIG. 5 shows an exemplary single-bit protocol timing diagram 500 for the single-bit circuit 400 of FIG. 4. The timing diagram 500 comprises the constituent timing diagram of each significant input and output of the single-bit noise resistant system 400 of FIG. 4. (Note that each line of the timing diagram "A"-"H" and "K"-"N" references a particular point in the circuit 400). A constituent timing diagram changes state only when an event represented by another constituent event occurs. The timing diagram includes an initial clock pulse 501, an output pulse 503 (or lack of a pulse for a "0" data, value), a single-pulse generator enable signal 505, a single-pulse generator disable period 507, a single-pulse generator re-enable signal 509, an SR latch set pulse 511 (prior to propagation through the third and fourth delay elements 411, 413), a delayed initial clock pulse 513, a delayed initial data pulse 515, a non-inverted latched output 517, an SR latch set pulse 519 (after propagation through the third and fourth delay elements 411, 413), and a start of a subsequent clock cycle 521. The initial data pulse 503 is shown at a high (i.e., "1") logic level for aid in understanding the timing diagram 500. However, one skilled in the art will recognize that a low logic data level will function appropriately. Additionally, an output of the optional second D-type flip-flop 429 at "M" depends on a state of a clock pulse at "K," an enable signal at "L," and a state of incoming secondary data from on-chip memory elements at "J."

On operation of the single-hit circuit 400, the clock/data pulse train concurrently passes to the first delay element 401 and the single-pulse generator 405. After propagation, an output from the first delay element 401 produces a delayed initial clock pulse 513 and the delayed initial data pulse 515.

A second portion of the clock/data pulse train continues as follows. Assuming the SR latch 409 is in the set position, the single-pulse generator 405 is enabled by the enable signal 505. A falling edge of the initial clock pulse 501 then forces the single-pulse generator 405 to produce an output pulse as shown at "B." After the delay incurred propagating through the second delay element 407, the pulse shown at "C" sends a reset to the SR latch 409. While the SR latch is in a reset 5 position, an output from the SR latch 409 is forced low, thereby placing the single-pulse generator 405 into a disabled position.

The output pulse from the generator 405 also propagates through the second and fifth delay elements 407, 415, thereby enabling the first D-type flip-flop 403. However, notice that the delayed clock pulse 513 occurs prior to the first D-type flip-flop being enabled (at "E"). Therefore, the clock pulse is stripped from the clock-data train pulse input to the single-bit circuit 400 and a non-inverted data pulse appears as the latched output 517 (at reference "H"). After an additional delay, the pulse at "E" propagates, causing the SR set pulse 519 (at reference "N"), thereby producing the pulse generator re-enable signal 509 for pulse generator 405 to be enabled for the start of a subsequent clock cycle 521. Further, the first D-type flip-flop 403 is only enabled to latch to the data pulse 503 after the data pulse 503 is in a stable region (see the delayed initial data pulse 515 at "G"), thereby ensuring reliability of data latched at the output of the D-type flip-flop 403.

Figure 6:
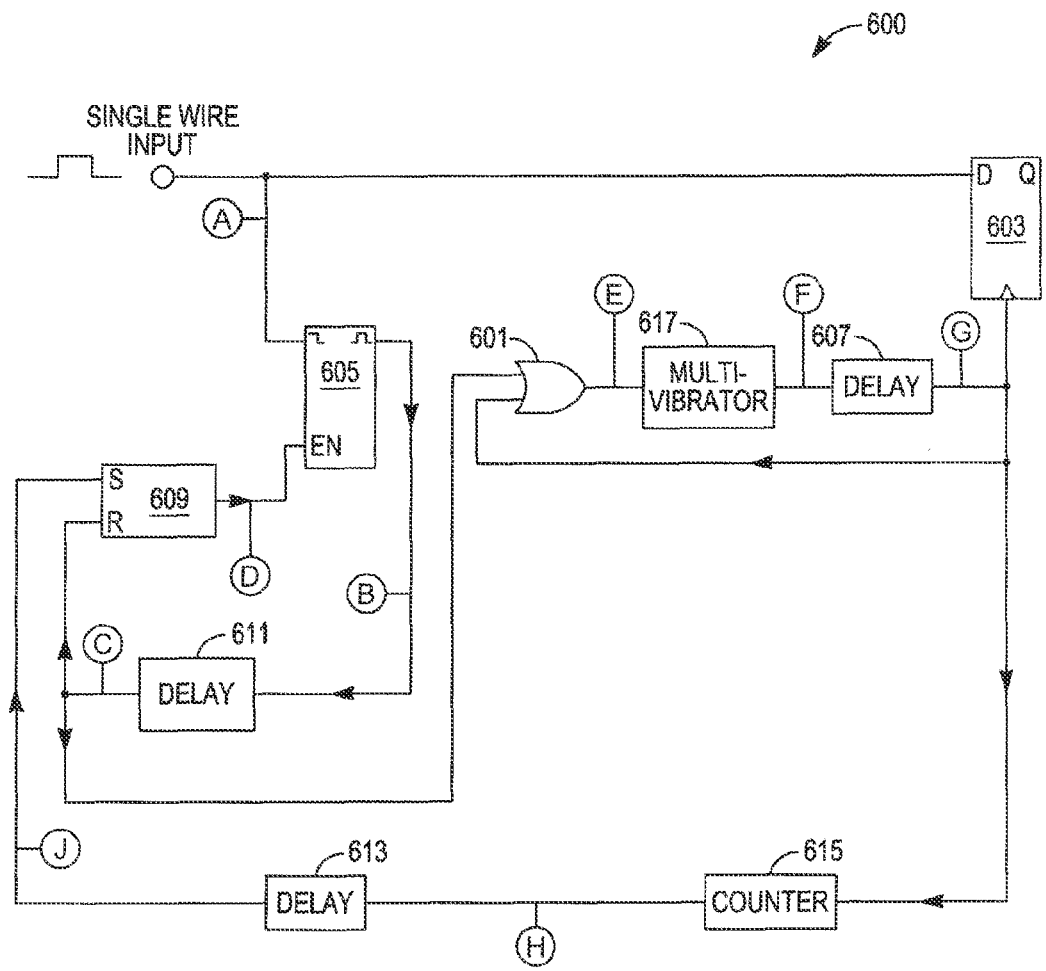
FIG. 6 is a schematic circuit diagram of an exemplary multi-bit implementation of the present invention to provide a communication protocol from over a single wire.

FIG. 6 shows an exemplary embodiment of a multi-bit noise resistant circuit 600. The multi-bit noise resistant circuit 600 includes an OR gate 601, a D-type flip-flop 603, a single-pulse generator 605, a first delay element 607, an SR-type latch 609, a second delay element 611, a third delay element 613, a count-by-n element 615, and a monostable multivibrator ("one-shot") 617.

As shown in this exemplary embodiment, a combination external clock and data pulse train enters the multi-bit noise resistant circuit 600 at a single wire input and is concurrently fed into an input of the single-pulse generator 605 and the D-type flip-flop 603. Assuming the SR latch 609 is in a "set" position a falling edge of an incoming external clock pulse produces a pulse at an output of the single-pulse generator 605. The pulse produced at the output of the pulse generator 605 starts an internal clock. The output of the pulse generator 605 is coupled to the second delay element 611. A pulse from an output of the second delay element 611 resets the SR latch 609. Concurrently the pulse is also an input to the OR gate 601. While at least one input of the OR gate is high, the one-shot 617 produces a pulse which is fed into the first delay element 607. An output of the first delay element 607 enables the D-type flip-flop 603. Concurrent with the flip-flop enablement an output of the first delay element 607 is also fed back to the OR gate 601 and to an input of the count-by-n element 615. The count-by-n element 615 may be, for example, an n-bit binary counter comprised of sequential logic. Once the count-by-n element 615 has achieved a desired count level, a pulse is transmitted into the third delay element 613. A delayed pulse from the third delay element 613 then places the SR latch 609 in a set position. When in a set position, an output of the SR latch 609 then enables the single-pulse generator 605 in preparation for a subsequent clock/data pulse train. An operation of the multi-bit noise resistant circuit 600 will be described in detail, infra. Letters "A"-"H" and "J" serve as references for a timing diagram of FIG. 7.

Figure 7:
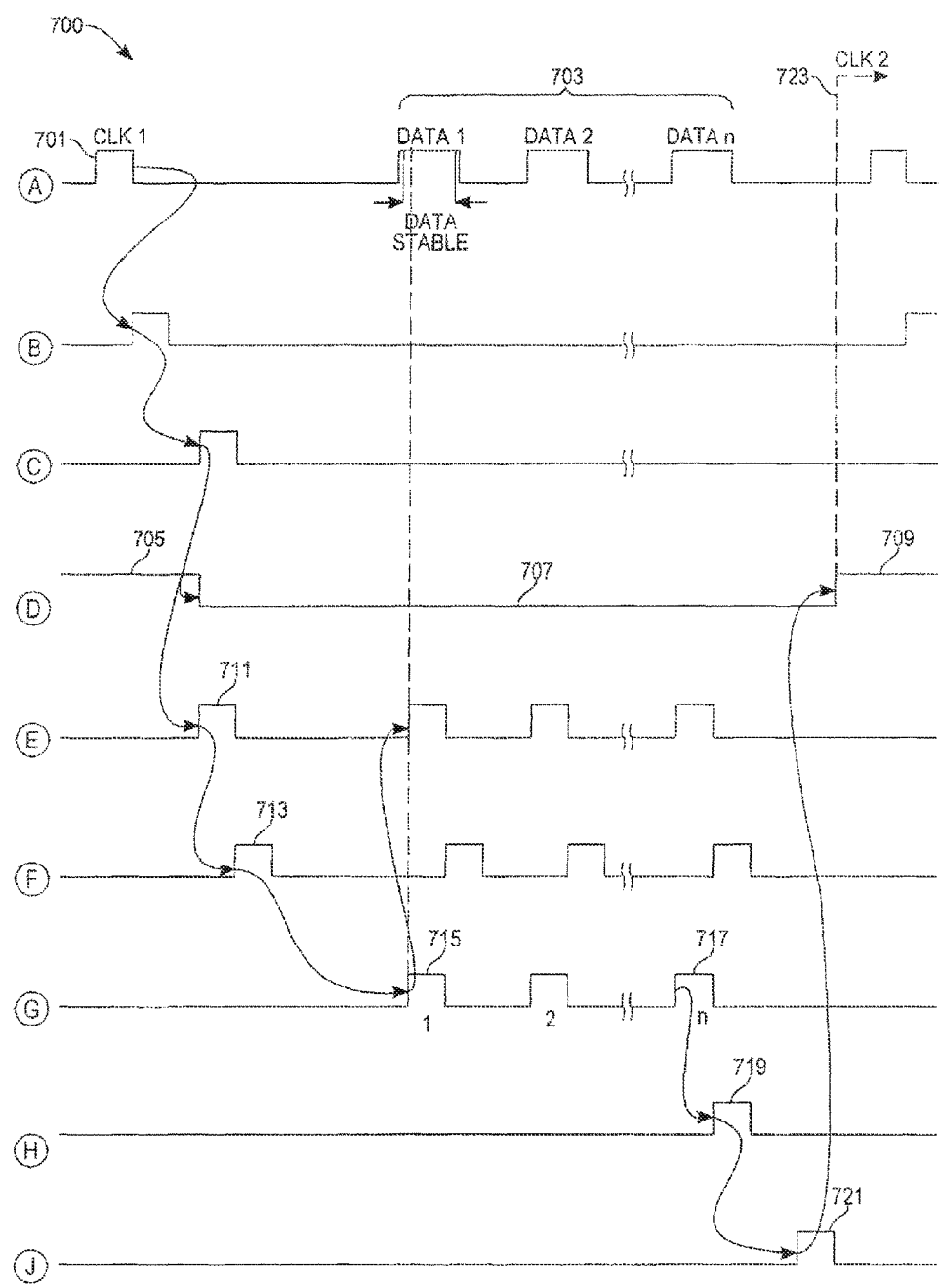
FIG. 7 is a timing diagram of the circuit of FIG. 6.

FIG. 7 shows an exemplary single-bit protocol timing diagram 700 for the multi-bit noise resistant circuit 600 of FIG. 6. The timing diagram 700 comprises the constituent timing diagram of each significant input and output of the multi-bit circuit 600 of FIG. 6. A constituent timing diagram changes state only when an event represented by another constituent event occurs. The timing diagram includes an initial clock pulse 701, a plurality of initial data pulses 703, a single-pulse generator enable signal 705, a single-pulse generator disable period 707, a single-pulse generator re-enable signal 709, an OR gate logic output 711, a one-shot output pulse 713, a first D-type flip-flop enable signal 715, a final D-type flip-flop enable signal 717, a count-by-n output pulse 719, an SR set pulse 721, and a start of a subsequent clock/data pulse train 723. The initial plurality of data pulses 703 are shown at a high logic level (i.e., "1") to aid in understanding the timing diagram 700. However, one skilled in the art will recognize that a low logic data level will function appropriately.

Unlike the single-hit noise resistant circuit 200 (FIG. 2) which passes through the first delay element 201 prior to the flip-flop 203, the clock data pulse train in the multi-bit circuit 600 passes directly to the D-type flip-flop 603. However, since the flip-flop 603 is not enabled, the initial clock pulse 701 is not latched to an output of the flip-flop 603. The SR latch 609 is in a set position at "D" and is therefore sending a single-pulse generator enable signal 705 to the single-pulse generator 605, thereby allowing an output pulse at "B" when triggered by the initial clock pulse 701. The output from the single-pulse generator 605 is also transmitted to the second delay element 611 causing a delayed pulse at "C." The delayed pulse at "C" forces a reset on the SR latch 609. While the SR latch 609 is in the reset position, an output from the SR latch 609 is forced low, placing the single-pulse generator 605 into a disabled period 707. Concurrent with the delayed output pulse resetting the latch 609, the delayed pulse is also transmitted through the OR gate 601 producing an OR gate logic output 711 at "E." The OR gate logic output 711 triggers the one-shot 617 producing the one-shot output 713 at "F." The one-shot output 713 is transmitted through the first delay element 607 producing the enable signal 715 for the D-type flip-flop 603, thereby latching a first of the plurality of initial data pulses 703 during a stable period of the first data pulse. Concurrently, the flip-flop enable signal 715 is also transmitted to the one-shot 617 through the OR gate 601. This transmitted pulse repeats the data read/latch cycle just described and depicted at "E," "F," and "G." Once the count-by-n element 615 reads the final data signal 717, the count-by-n element 615 produces the count-by-n pulse 719. The count-by-n pulse 719 is transmitted through the third delay element 613 producing the SR latch set pulse 721 at "J." In turn, the SR set pulse 721 sends the re-enable signal 709 to the single-pulse generator 605, thus resetting the multi-bit circuit 700 for the start of the subsequent clock/data pulse train 723.

Figure 8:
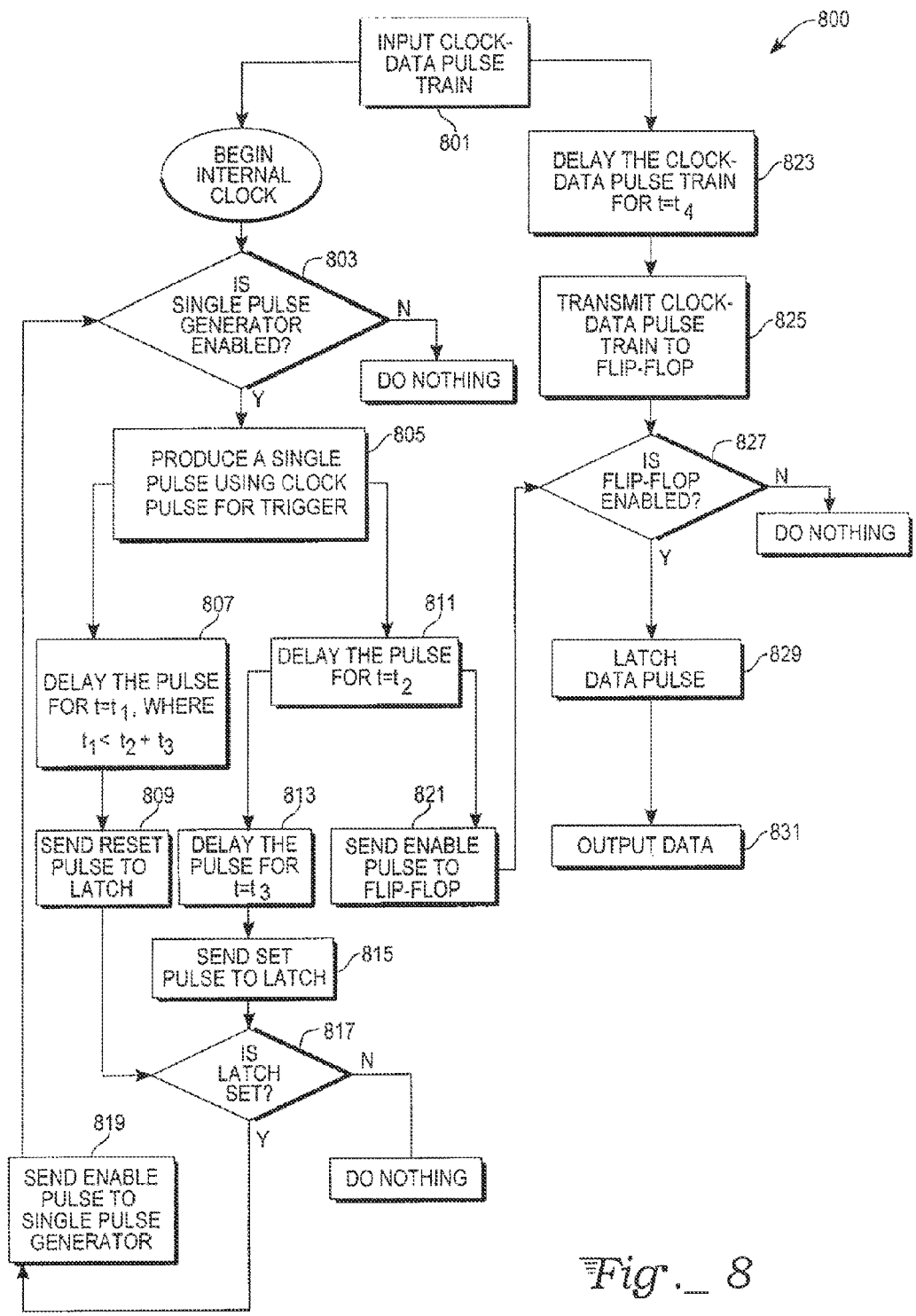
FIG. 8 is a flowchart of a method of operation of the schematic circuit of FIG. 2.

With reference to FIG. 8, a flowchart 800 of a method of operation of the single-bit noise resistant circuit 200 of FIG. 2 is presented. Initially, an external clock/data pulse train is presented to the single-bit circuit 200. From there, the pulse is split into two paths. On the left, an internal clock pulse is started. At step 803, if the single-pulse generator 805 is enabled, a single pulse is generated using the external clock pulse as a trigger 605. The pulse is split a second time into two paths.

The left branch of the second split delays the single pulse generated in step 805 for a time, $t_1$, where $t_1$ is less than a summation of delay times $t_2$ and $t_3$, discussed below. In general, all delay times are chosen based upon a specification of external clock pulse frequencies, pulse widths, and time between clock and data pulses. All required delays are readily determined by a skilled artisan and will not be elaborated upon herein. After the delay step 807, a reset pulse 809 is sent to the SR latch 209.

The left branch of the second split starts with a second delay for a time $t_2$ 811. The pulse is split a third time into two additional branches. The left branch of the third split begins with a third delay for time $t_3$ 813. After the third delay step 813, a set pulse is sent 815 to the SR latch 209. A determination is made whether the latch 209 is set 817. If the latch 809 is set, an enable pulse is sent 819 to the single-pulse generator 205. Once the single-pulse generator 205 is enabled, the single-bit circuit is ready for a subsequent external clock and data pulse.

After the initial split from step 801, the right branch of the flowchart proceeds as follows. The clock/data pulse train is delayed for a fourth delay time $t_4$ 823 prior to being transmitted to the flip-flop 203. If the flip-flop 203 is enabled 827, the data pulse is latched 829 and output 631. Note that the flip-flop enable pulse occurs after step 811 when the enable pulse is sent to the flip-flop 203 in step 821. The delays are calculated such that 1) the flip-flop 203 is not enabled during an external clock pulse, and 2) the data pulse is latched only during a data stable portion of the data pulse (see FIG. 3 at "G").

Figure 9:
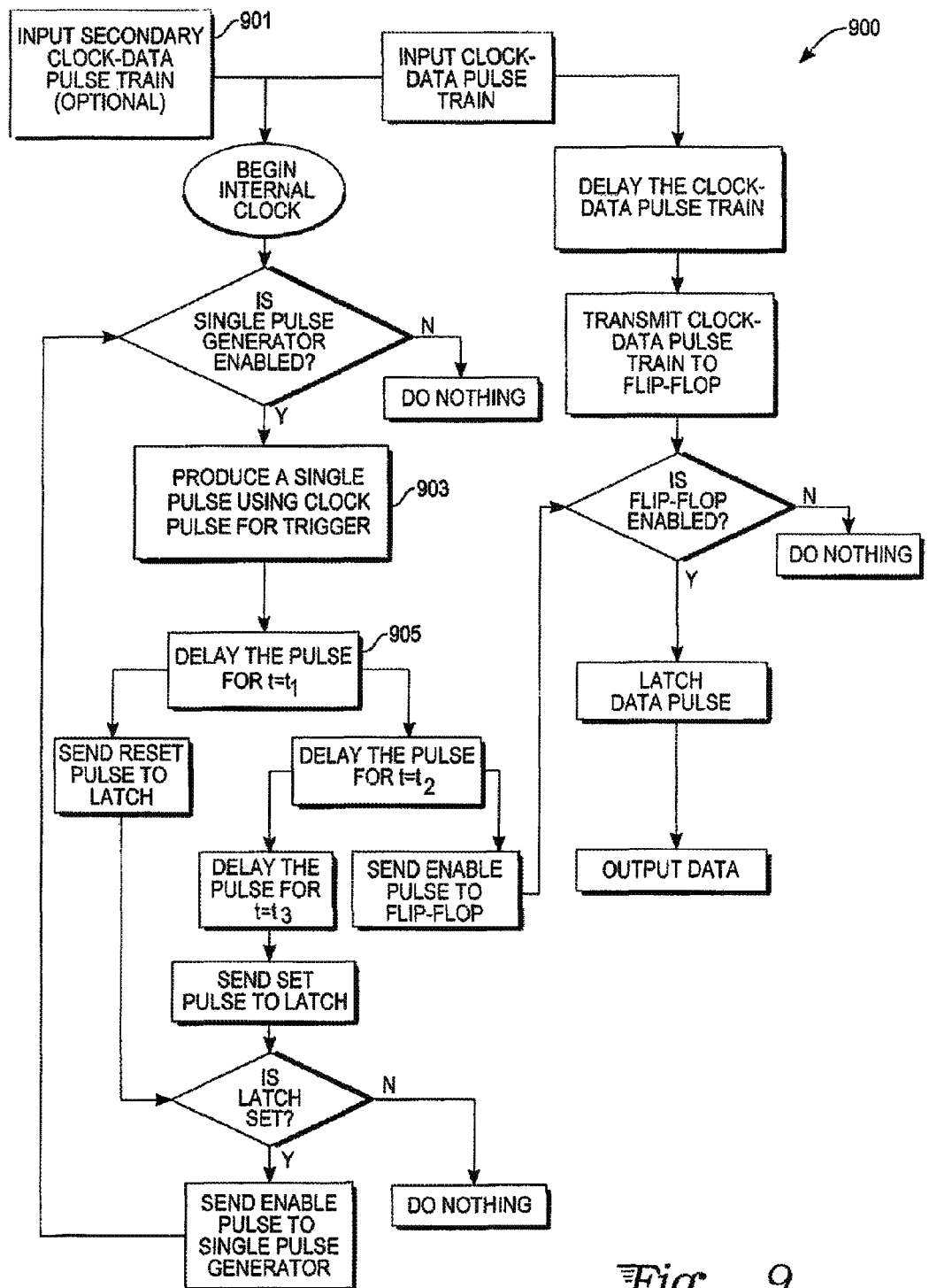
FIG. 9 is a flowchart of a method of operation of the schematic circuit of FIG. 4.

With reference to FIG. 9, a flowchart 900 of a method of operation of the single-hit noise resistant circuit 400 of FIG. 4 is presented. Notice that this flowchart is similar to flowchart 800 of FIG. 8. The primary significant differences between flowcharts 800 and 900 occur with reference to steps 901, 903, and 905. Step 901 accepts an optional input to the single-bit noise resistant circuit 400 from a secondary external clock-pulse data train. At step 903, a single pulse is produced by the single pulse generator 405. The generated pulse is then delayed in step 905 for time $t=t_1$ before taking bifurcated routes. Thus, the method of operation presented in flowchart 900 is in contrast to the route of the generated pulse immediately being bifurcated in step 805.

Figure 10:
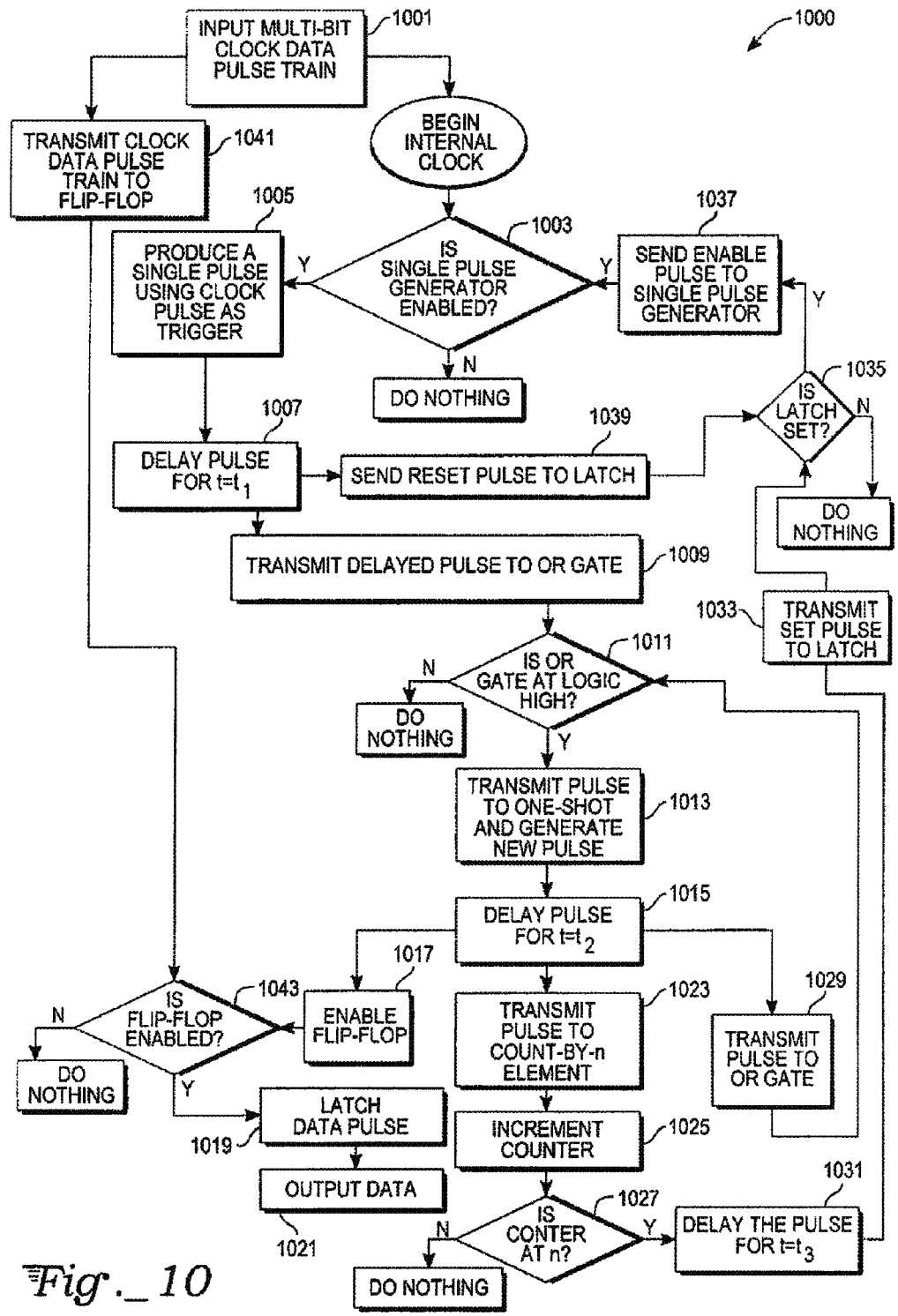
FIG. 10 is a flowchart of a method of operation of the schematic circuit of FIG. 4.

FIG. 10 shows a flowchart 1000 of a method of operation of the multi-hit noise resistant circuit 600 of FIG. 6. Initially, an external clock/dam pulse train is presented to the multi-bit circuit 600. Similar to FIG. 8, the pulse is split into two paths. On the left branch, the clock/data pulse train is transmitted 1041 to the flip-flop 603. On the right, an internal clock pulse is started. At step 1003, if the single-pulse generator 605 is enabled, a single pulse is generated using the external clock pulse as a trigger 1005. The pulse is then delayed for a time, $t_1$, 1007. The pulse is then split a second time into two additional paths. On the right, a reset pulse is sent 1039 to the SR latch 609, thereby preventing any additional pulses being generated by the single-pulse generator 605 until a subsequent external clock/data pulse train is received. Data pulses are unable to trigger a single pulse since the single-pulse generator 605 is not enabled while the SR latch 609 is in a reset condition.

The left branch of the second split transmits the delayed pulse 1009 to the OR gate 601. If a determination is made 1011 that at least one OR gate input is at logic high, the pulse is transmitted 1013 to the one-shot 617, thereby generating a new pulse. The new pulse is delayed 1015 for time $t_2$. After the time delay $t_2$ 1015, the pulse is split three ways.

Starting with the far left branch, the delayed one-shot pulse is used to enable the flip-flop 603. Once a determination is made 1043 that the flip-flop is enabled, the data pulse transmitted from step 1041 is latched 1019 and the data pulse is output 1021. As with the flowchart 800, the various delay times are established such that a clock pulse does not arrive at an output flip-flop while the flip-flop is enabled. Other timing elements are determined in a way well known to one skilled in the art.

The center branch of the three-way split after step 1015 starts by transmitting a pulse to the count-by-n element 615 in step 1023. An internal counter on the count-by-n element 615 is incremented 1025. A determination 1027 is made whether the internal counter equals n. For example, if a clock/data pulse is designed to have 8 data pulses (i.e., n=8) between external clock pulses, than the count-by-n element 615 is chosen to be an eight bit counter. If the internal counter equals n (i.e., all n data hits have been received) the transmitted pulse is delayed for time $t_3$. The delayed pulse 1033 is then transmitted to "set" the SR latch 609, thereby preparing the multibit circuit 600 to receive a subsequent external clock/data pulse train.

Concurrent with the pulse being transmitted to the count-by-n element 615 from step 1015, the far right branch of the three-way split transmits the pulse 1029 to the OR gate 601. This forces at least one input of the OR gate to logic high, so the cycle is repeated at step 1011 until the count-by-n element 615 equals n as described supra. Compare to FIG. 3 at "E"-"H."

Similar to the method of operation 800 for the single-bit circuit 200, the delays for the multi-hit method 1000 are calculated such that 1) the flip-flop 603 is not enabled during an external clock pulse, and 2) the data pulse is latched only during a data stable portion of the data pulse (see FIG. 7 at "A").

Figure 11:
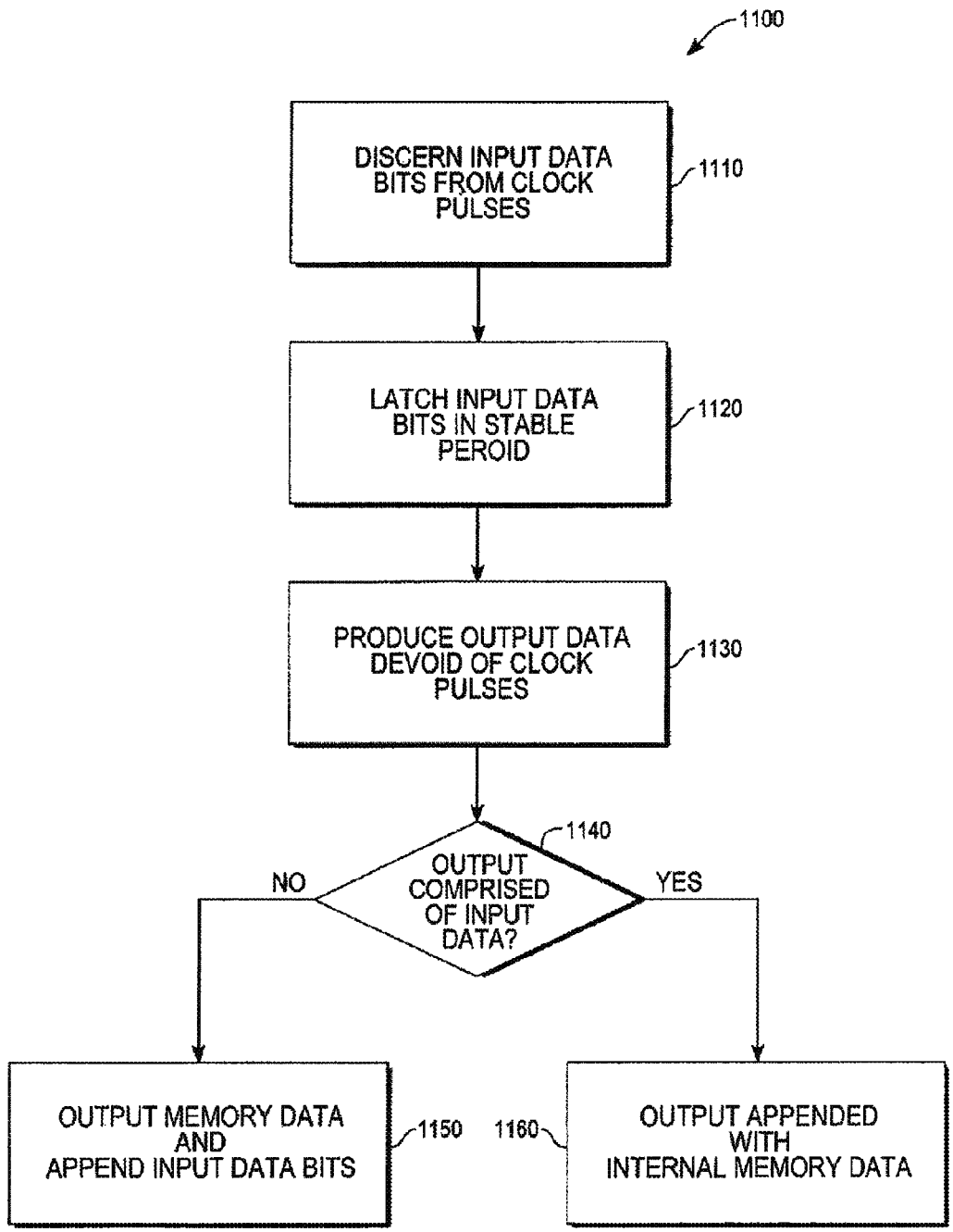
FIG. 11 is a flowchart of a method of operation of the schematic circuit of FIG. 4.

With reference to FIG. 11, serial data output is produced with a single wire device from a data stream having one or more clock pulses in series with one or more input data bits in a serial data output method 1100. The one or more input data bits are discerned 1110 from the one or more clock pulses in the data stream. The one or more input data bits are latched 1120 during a stable period of the data stream. Serial output data are produced 1130, devoid of the one or more clock pulses, from either data from an internal memory or from the one or more input data bits. If a determination 1140 is made that the output is to be comprised of input data, then the output is appended 1160 with data from an internal memory. Otherwise, the output is produced from internal memory and appended 1150 with input data bits.

Figure 12:
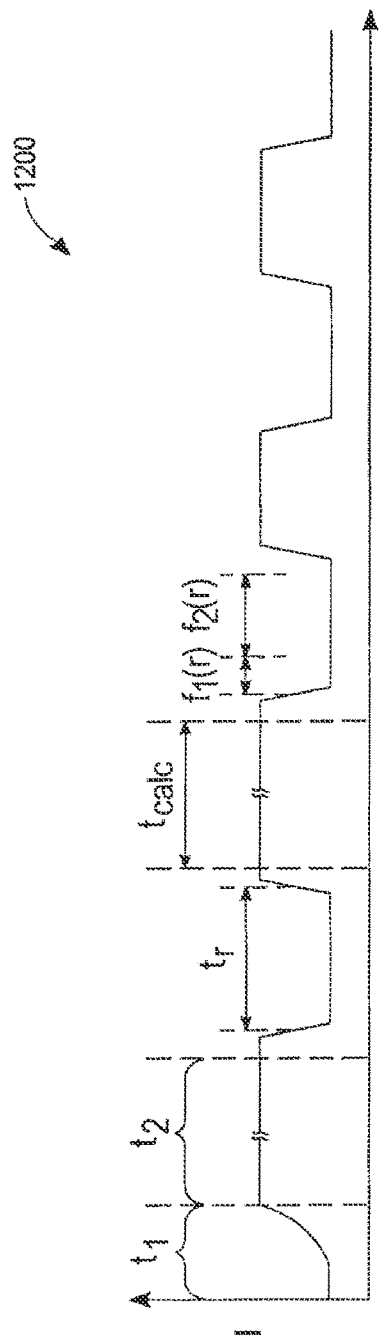
FIG. 12 is an exemplary timing diagram of a single wire protocol.

With reference to FIG. 12, an input signal "I" on a single wire bus, ramps up during a power up time $t_1$ in an exemplary single wire protocol waveform diagram 1200. A ramp up characteristic of the input signal "I" during the power up time $t_1$ is determined by a pullup resistor on the single wire bus. The pullup resistor may be external to a plurality of integrated circuits communicating on the bus and supplies a high logic level that driving devices within the integrated circuits may pull down against to produce electrical signaling.

A second time frame of the input signal is a timeout period $t_2$. The timeout period $t_2$ is provided so that once the high logic level is attained during the power up time $t_1$, an amount of time is allowed to elapse within each integrated circuit on the bus before any communication is initiated. All transmit and receive circuitry within roaster and receiver integrated circuits is held in a quiescent state during the timeout period $t_2$ and no communication is undertaken. The timeout period $t_2$ ensures that no false starts of transmission occur during the power up phase of the bus due to noise or other incidental transitions that may occur during and immediately following the power up time $t_1$.

After the timeout period h elapses, a bus master, which may be for example, a microcontroller, produces a time reference pulse $t_r$ on the single wire bus. The time reference pulse $t_r$ produced by a bus master is an indication of the length of time making up one timeframe containing one quantity of data signaling. The duration of the time reference pulse $t_r$ determines the frequency at which the bus master communicates data to receivers on the single wire bus. In order for a receiver to properly acquire data transmitted by the bus master, the receiver must sample the time reference pulse $t_r$, determine its duration, and set up internal circuitry with timing that enables acquisition of data at the rate determined by the time reference pulse $t_r$.

In order for a receiver on the single wire bus to determine the duration of the time reference pulse $t_r$, circuitry within the receiver must be able to effectively measure the duration of the pulse and calculate and appropriate response for setting up the timing of internal circuitry to be able to communicate at the rate determined by the time reference pulse. A calculation time $t_{calc}$ is defined as a period of time following the time reference pulse $t_r$ that a receiver is allowed for assessing the duration of the time reference pulse $t_r$ based on certain calculations by internal circuitry to the receiver.

Once the calculation time $t_{calc}$ has transpired and circuitry internal to the receiver has determined a duration of the time reference pulse, essential characteristics of timing required in the receiver for sampling data from the bus master may be determined. Two quantities required for sampling data transmitted from the bus master are a sample delay time $f_1(t_r)$ and a sample time $f_2(t_r)$. Both the sample delay time $f_1(t_r)$ and the sample time $f_2(t_r)$ are a function of the magnitude of the time reference pulse $t_r$. The sample delay time $f_1(t_r)$ is the amount of time following the transition of a clock signal on the single wire bus that circuitry within the receiver must wait before sampling for a transition of the input signal "I" corresponding to a data signal on the single wire bus. The sample delay time $f_1(t_r)$ is also an applicable wait time for the same circuitry within the receiver to wait after the final signal transition of a previous data timeframe before sampling for a subsequent data signal where a plurality of successive data bits are transmitted within a protocol.

A further essential timing characteristic of the circuitry within the receiver is the sample time $f_2(t_r)$. This is the amount of time following the sample delay time $f_1(t_r)$ that transitions of a data signal may be sampled. The duration of the sample time $f_2(t_r)$ is in effect a sampling window and the sample delay time $f_1(t_r)$ is the timing characteristic that positions the sampling window within one single wire protocol time frame. Successive application of the sample delay time $f_1(t_r)$ and the sample time $f_2(t_r)$ after each trailing edge of a clock or prior data signal, provides proper timing for circuitry within the receiver to correctly sample data.

Figure 13:
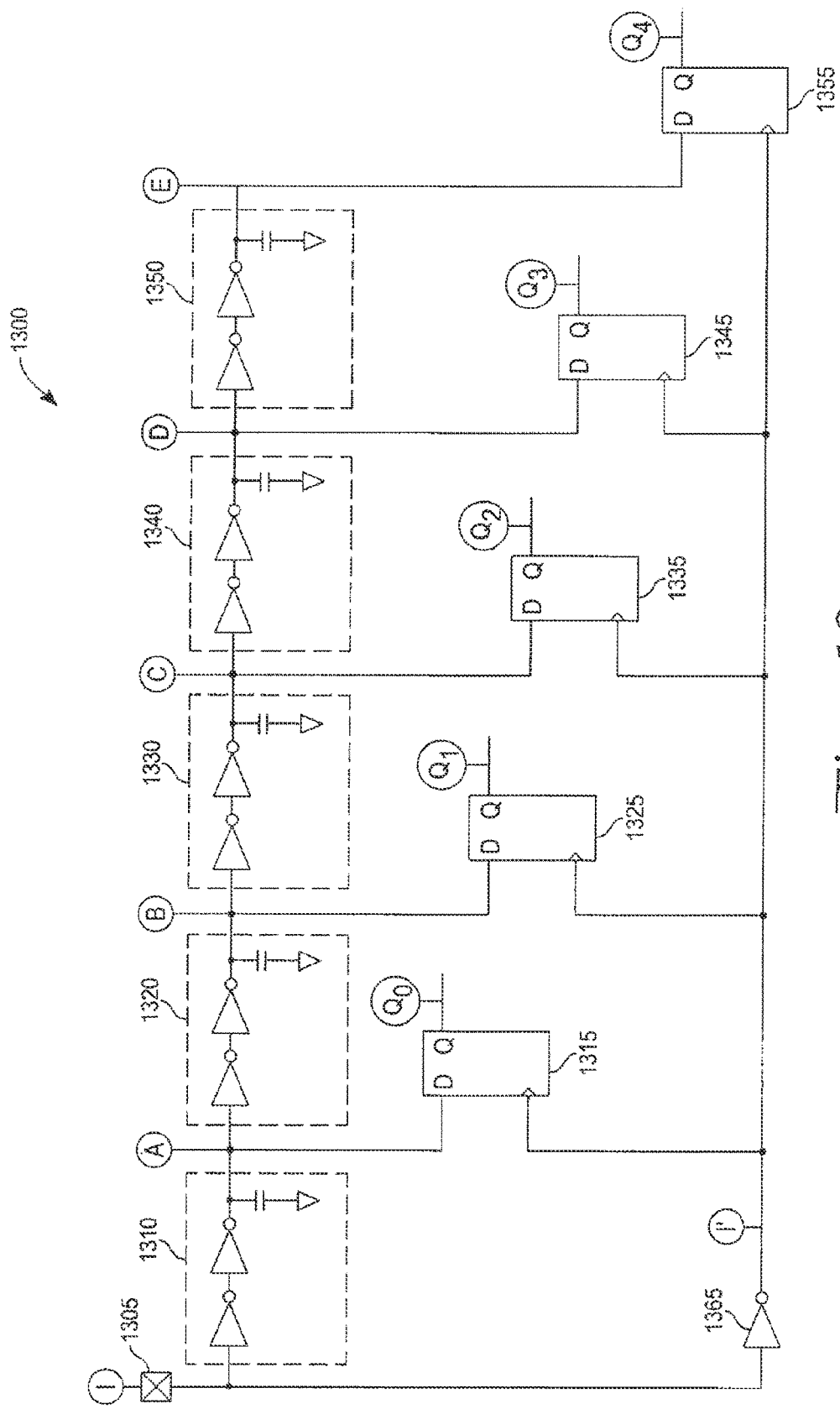
FIG. 13 is an exemplary schematic diagram of a time reference circuit.

With reference to FIG. 13, a single wire input signal "I" is applied at a single wire input 1305 of an exemplary schematic diagram of a time reference device 1300. A sequence of, for example, five delay stages are connected in series. A delay stage may be composed of for example, two inverters connected in series with a capacitor. Alternatively, a number of inverter pairs and a value of the capacitor may be selected to add up to a desired delay of each stage. Additionally, delays of the delay stages may be chosen to be not equal to one another. For example a magnitude of delay for each stage may form a progression so that an increasing or decreasing value of delay between successive stages allows for an expansion in the scope of time captured at a measurement time, or in the case of decreasing values, forms a finer grain resolution for determining a trailing edge of a reference pulse which may be applied at the single wire input 1305.

An input of a first delay stage 1310 connects to the single wire input 1305. The series connections are made by an output of a previous delay stage connecting to an input of a successive delay stage. A first delay stage output signal "A" is produced at an output of the first delay stage 1310 where a connection is made to an input of a second delay stage 1320. A second delay stage output signal "B" is produced at an output of the second delay stage 1320 where a connection is made to an input of a third delay stage 1330. A third delay stage output signal "C" is produced at an output of the third delay stage 1330 where a connection is made to an input of a fourth delay stage 1340. A fourth delay stage output signal "D" is produced at an output of the fourth delay stage 1340 where a connection is made to an input of a fifth delay stage 1350. A fifth delay stage output signal "E" is produced at an output of the fifth delay stage 1350.

The first delay stage output signal "A" is provided to a data input of a first latch 1315 from the output of the first delay stage 1310. A second delay stage output signal "B" is provided to a data input of the second latch 1325 from the output of the second delay stage 1320. The third delay stage output signal "C" is provided to a data input of the third latch 1335 from the output of the third delay stage 1330. The fourth delay stage output signal "D" is provided to a data input of the fourth latch 1345 from the Output of the fourth delay stage 1340. The fifth delay stage output signal "E" is provided to a data input of a fifth latch 1355 from the output of the fifth delay stage 1350.

A first latch output signal "$Q_0$" is produced at an output of the first latch 1315. A second latch output signal "$Q_1$" is produced at an output of the second latch 1325. A third latch output signal "$Q_2$" is produced at an output of the third latch 1335. A fourth latch output signal "$Q_3$" is produced at an output of the fourth latch 1345. A fifth latch output signal "$Q_4$" is produced at an output of the fifth latch 1355.

A logic inversion device is connected to the single wire input 1305. A logic inversion device output signal "I'" is produced at an output of the logic inversion device 1365 and is provided to a clock input of each of the first latch device 1315, the second latch device 1325, the third latch device 1335, the fourth latch device 1345, and the fifth latch device 1355.

Figure 14:
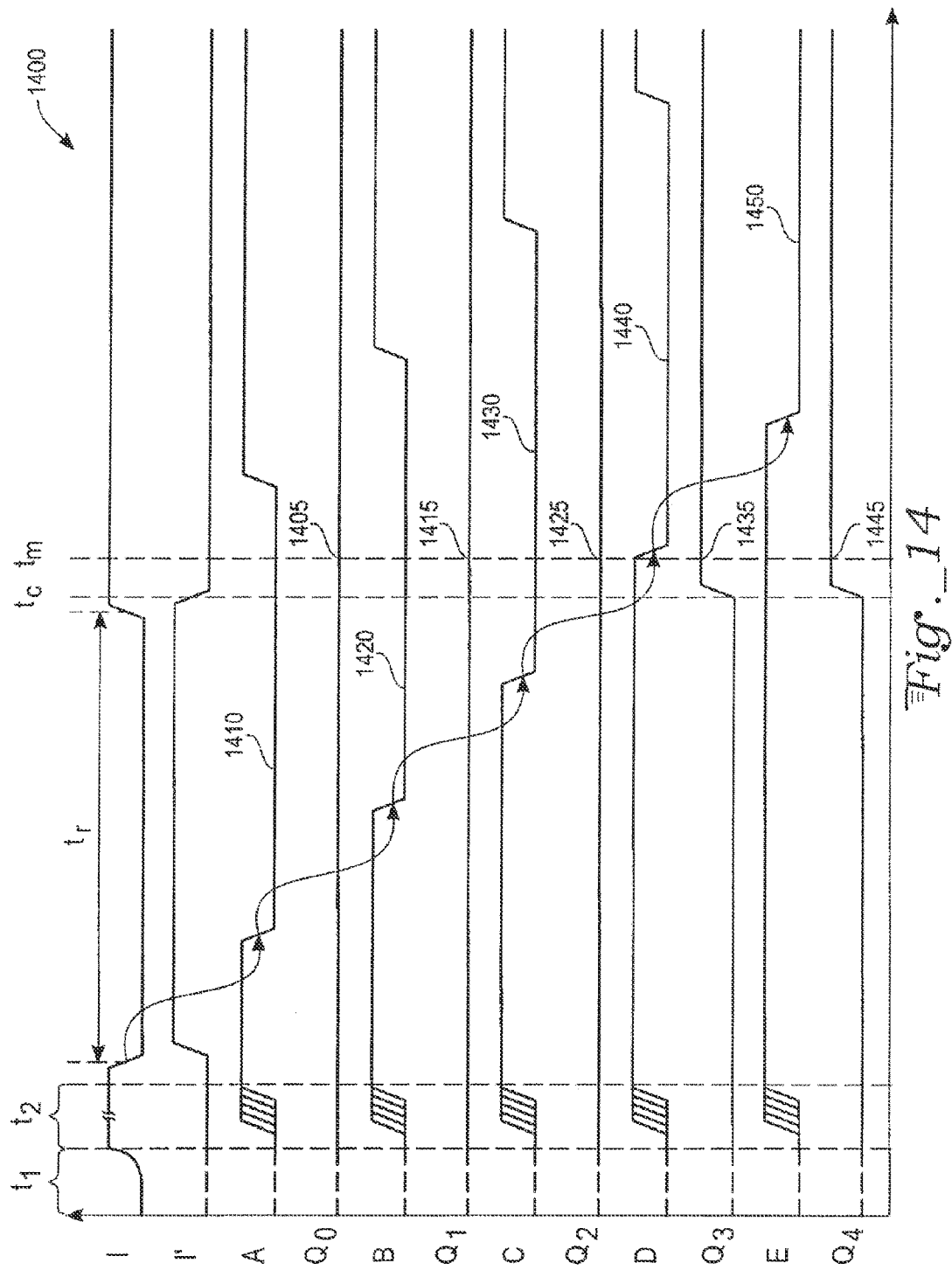
FIG. 14 is a timing diagram of the circuit of FIG. 13.

With reference to FIG. 14, the power up time $t_1$ (FIG. 12) precedes the timeout period $t_2$ on a single wire input signal "I" in an exemplary time reference timing diagram 1400. The high logic level produced on the single wire input signal by the pullup device on the single wire bus, propagates through the first delay stage 1310 and produces a high logic level on the first delay stage output signal "A" during the timeout period $t_2$. Continued propagation of the high logic level through the remainder of the serially connected delay stages 1320, 1330, 1340, 1350 produces a succession of high logic levels on the remainder of the delay stage output signals "B", "C", "D", "E".

The time reference pulse $t_r$ (FIG. 12) produced by the bus master, is provided to the single wire bus after the timeout period $t_2$. In a similar fashion to the propagation of the high logic level during the timeout period $t_2$, the time reference pulse $t_r$ propagates through the delay stages 1310, 1320, 1330, 1340, 1350. In a cascading fashion, the propagation of the time reference pulse $t_r$ produces a similar pulse occurring at an offset delay due to the delay within each of the serially connected delay stages 1320, 1330, 1340, 1350. Therefore, a sequence of derivatives of the time reference pulse $t_r$ 1410, 1420, 1430, 1440, 1450 are produced in sequence on the delay stage output signals "A", "B", "C", "D", "E".

Propagation of the time reference pulse $t_r$ through the logic inversion device 1365 produces a derivation of the time reference pulse $t_r$ as the logic inversion device output signal "I'". The derivation of the time reference pulse $t_r$ may be for example, an inversion of the time reference pulse $t_r$ produced at an output of the logic inversion device 1365. As an inverted derivative of the time reference pulse $t_r$, the trailing edge of the inverted time reference pulse is configured to produce a clock time signal $t_c$. Formation of the derivative of the time reference pulse $t_r$ is a configuration of a signal with an appropriate species of edge occurring at an appropriate time to operate as a clock signal for the series of latches 1315, 1325, 1335, 1345, 1355 (FIG. 13). The clock time signal $t_c$ is provided to the clock input of each of the series of latches 1315, 1325, 1335, 1345, 1355. The clock time signal $t_c$ causes the series of latches 1315, 1325, 1335, 1345, 1355 to activate and latch a signal level at each respective latch input.

Propagation through the series connection of delay stages positions the time reference pulse $t_r$ topologically and in time along the sequence of delay stage output signals "A", "B", "C", "D", "E". The time reference pulse $t_r$ at any given time, is at a different stage of progression with respect to the input of each of the series of latches 1315, 1325, 1335, 1345, 1355. If the time reference pulse $t_r$ has had enough time to propagate to the input of an $n_{th}$ latch, the input of the $n_{th}$ latch is low and when clocked, a corresponding low logic level is present as the $n_{th}$ latch output signal $Q_n$ (where $Q_n$ is representative of the latch output at the $n_{th}$ stage of the series connection of latches) If the time reference pulse $t_r$ has not had enough time to propagate to the input of the $n_{th}$ latch, the input of the $n_{th}$ latch is still at a high logic level, resulting from the level being established during the power up time $t_1$.

The leading edge transition of the time reference pulse $t_r$ propagating through the series connection of the delay stages 1310, 1320, 1330, 1340, 1350 means that according to position within the series of connections, any given latch captures a level prior to or after the leading edge of the time reference pulse $t_r$ when the given latch is activated. All latches prior to the leading edge transition (topologically in the schematic diagram of FIG. 13) capture a low logic level and all latches subsequent to the leading edge transition capture a high logic level. The latch output signals "$Q_0$", "$Q_1$", "$Q_2$", "$Q_3$", "$Q_4$" are measured at a measurement time $t_m$ which occurs after a settling time characteristic of the series of latches 1315, 1325, 1335, 1345, 1355. For example, at the measurement time $t_m$, the first three latches 1315, 1325, 1335 are provided with a low level from a preceding delay stage output signal "A", "B", "C". The first three latch output signals "$Q_0$", "$Q_1$", "$Q_2$" at the measurement time tm 1405, 1415, 1425 are also at a low level. The last two latches 1345, 1355 are provided with a high level from a preceding delay stage output signal "D", "E". The last two latch output signals "$Q_3$", "$Q_4$" at the measurement time tm 1435, 1445 are also at a high level.

The latch output signals "$Q_0$", "$Q_1$", "$Q_2$", "$Q_3$", "$Q_4$", taken as an ordered sequence, produce a positional value of the trailing edge transition of the time reference pulse $t_r$. With the respective values of the latch output signals "$Q_0$", "$Q_1$", "$Q_2$", "$Q_3$", "$Q_4$" analyzed as a sequence of values corresponding to the presence or absence of a reference level, a position in time of the time reference pulse $t_r$ within the exemplary time reference device 1300 is determined. For example, the positional value 00011 is produced by the latch output signals "$Q_0$", "$Q_1$", "$Q_2$", "$Q_3$", "$Q_4$" at the measurement time $t_m$ 1405, 1415, 1425, 1435, 1445. The positional value 00011 indicates that the trailing edge of the time reference pulse $t_r$ occurred between three and four delays times. The positional value is a magnitude characteristic of the time reference pulse $t_r$ and is usable by internal circuitry (not shown) of a receiver for establishing sampling time characteristics during the calculation time $t_{calc}$. Key sampling time characteristics so determined are the sample delay time $f_1(t_r)$ and sample time $f_2(t_r)$ (FIG. 12).

An additional sampling time characteristic is the point in a protocol when a transmission phase has ended. A particular transmission termination characteristic is, for example, a stop time $f_{stop}(t_r)$ (not shown). The stop time $f_{stop}(t_r)$ of a protocol is also a function of the time reference pulse $t_r$. After a given phase of a transmission concludes either a next phase of transmission follows or the receiver is able to commence a next operation/such as writing of the data just received. For example, to signify to a receiver that a write is possible after address and data are sent, the master does not cause a transition signal, for example, and does not pull the voltage level on the single wire bus to a low level. The receiver waits an amount of time equal to the stop time $f_{stop}(t_r)$ and samples the bus level. If after the stop time $f_{stop}(t_r)$ elapses and the level on the bus remains high, the receiver knows that the present transmission phase has concluded and a writing phase may be initiated by the receiver. In a complementary situation, after the stop time $f_{stop}(t_r)$ elapses and the level on the bus is not high, the receiver knows that the master is commencing a next transmission phase and the receiver must respond accordingly.

By configuring a magnitude of delay in each of the delay stages 1310, 1320, 1330, 1340, 1350 to correspond to an expected range of magnitudes of lime reference pulses $t_r$ to be received, a receiver is able to autonomously determine a rate at which data is transmitted by a master and set sampling time characteristics accordingly to correctly receive data from the master. Essential sampling time characteristics are derivable by a receiver for determining when to initiate sampling, how long to sustain sampling, and when sampling may conclude, thus allowing the receiver to go on to other processes. In this way/a reference time for a single wire protocol and the ensuing essential timing characteristics for sampling data within the protocol are determined.

Although the detailed description and drawings describe various embodiments and methods for single- and multi-hit circuits for implementing a communication protocol, one skilled in the art will recognize that other embodiments can readily be contemplated without departing from the intended scope of the device described. For example, various types of flip-flops and latches are referenced herein. However, a skilled artisan will recognize that many other combinational logic circuits will have the same effect as components of the present invention. A skilled artisan will recognize that a number of inverter pairs and a value of the capacitor may be selected to accumulate a desired delay of each stage. Additionally, delays may be chosen to be not equal to one another. For example a magnitude of delay between stages may form a progression so that an increasing or decreasing value of delay between successive stages allows for an expansion in the scope of time captured at the measurement time or in the case of decreasing values, forms a finer grain resolution for determining a trailing edge of a reference pulse. One skilled in the art will recognize that a range of magnitudes of time reference pulses will correspond to the selection of magnitudes in each delay stage and any progression assigned to the delay magnitudes.

Additionally, delay elements are shown as hardware elements implemented with inverters. One of skill in the art will also recognize that other hardware or software changes may be implemented that are still within the scope of the present invention. Therefore, the scope of the present invention shall only be limited by the appended claims.

What is claimed is:

1. A method for receiving a serial data input into a single wire device, comprising:
   inputting, into the single wire device, a clock pulse generated external to the single wire device, and a first plurality of data bits that are in series with the external clock pulse, forming a cycle;
   producing, using a pulse generator, a first pulse in response to the external clock pulse;
   delaying the first pulse for a first delay time;
   producing a second pulse in response to the delayed first pulse;
   delaying the second pulse for a second delay time;
   providing the external clock pulse and the first plurality of data bits to an input latching device;
   activating the input latching device using the delayed second pulse;
   latching first data from the first plurality of data bits using the input latching device; and
   storing the first data.

2. The method of claim 1, further comprising:
   incrementing a counter using the delayed second pulse;
   in response to incrementing the counter, producing a third pulse using the counter when the counter reaches a predetermined count level;
   delaying the third pulse by a third delay time;
   setting the pulse generator for a retrieval cycle using the delayed third pulse;
   providing a second plurality of data bits to the input latching device in the retrieval cycle;
   activating the input latching device with a subsequent delayed second pulse in the retrieval cycle;
   latching second data from the second plurality of data bits using the input latching device;
   storing the second data; and
   incrementing the counter in the retrieval cycle using the subsequent delayed second pulse.

3. The method of claim 2, wherein the retrieval cycle is one of a plurality of retrieval cycles, and wherein a number of the plurality of retrieval cycles produced corresponds to a number of bits configured in the counter.

4. The method of claim 1, wherein a duration of the first delay time is greater than a duration of the second delay time, and
   wherein a difference between the durations of the first and second delay times is configured to allow latching only the first data from the first plurality of data bits.

5. The method of claim 1, wherein the pulse generator includes a single-pulse generator.

6. The method of claim 1, wherein producing the second pulse comprises:
   producing the second pulse using a multivibrator included in the single wire device.

7. A single wire device comprising:
   a data input terminal that is configured to accept a clock pulse generated external to the single wire device, and a first plurality of data bits that are in series with the external clock pulse, forming a cycle;
   a first pulse generator that is coupled to the data input terminal and configured for producing, a first pulse in response to the external clock pulse;
   a first delay element that is coupled to the first pulse generator and configured for delaying the first pulse for a first delay time;
   a second pulse generator that is coupled to the first delay element and configured for producing a second pulse in response to the delayed first pulse;
   a second delay element that is coupled to the second pulse generator and configured for delaying the second pulse for a second delay time; and
   an input latching device that is coupled to the data input terminal and the second delay element, and configured for activation using the delayed second pulse, wherein the input latching device is further configured for:
      receiving the external clock pulse and the first plurality of data bits,
      latching first data from the first plurality of data bits, and storing the first data.

8. The single wire device of claim 7, further comprising:
   a counter that is coupled to the second delay element and configured for:
      receiving the delayed second pulse and incrementing a count value based on the delayed second pulse, and
      in response to incrementing the count value, producing a third pulse when the count value reaches a predetermined count level; and
   a third delay element that is coupled to the counter and configured for delaying the third pulse by a third delay time, wherein
   the first pulse generator is further set for a retrieval cycle using the delayed third pulse,
   the second pulse generator is further configured to accept a second plurality of data bits and providing the second plurality of data bits to the input latching device in the retrieval cycle,
   the input latching device is activated with a subsequent delayed second pulse in the retrieval cycle, the input latching device further configured for latching second data from the second plurality of data bits, and storing the second data, and
   the counter is further configured to be incremented in the retrieval cycle using the subsequent delayed second pulse.

9. The single wire device of claim 8, wherein the retrieval cycle is one of a plurality of retrieval cycles, and wherein a number of the plurality of retrieval cycles produced corresponds to a number of bits configured in the counter.

10. The single wire device of claim 7, wherein a duration of the first delay time is greater than a duration of the second delay time, and
    wherein a difference between the durations of the first and second delay times is configured to allow latching only the first data from the first plurality of data bits.

11. The single wire device of claim 7, wherein the first pulse generator includes a single-pulse generator.

12. The single wire device of claim 7, wherein second pulse generator includes a multivibrator.

* * * * *

UNITED STATES PATENT AND TRADEMARK OFFICE
CERTIFICATE OF CORRECTION

| | |
|---|---|
| PATENT NO. | : 8,861,666 B2 |
| APPLICATION NO. | : 13/337543 |
| DATED | : October 14, 2014 |
| INVENTOR(S) | : Philip S. Ng |

It is certified that error appears in the above-identified patent and that said Letters Patent is hereby corrected as shown below:

On the Title Page, Item (57)

Col. 2 (Abstract), Line 2 Delete "input," and insert --input--, therefor.

Col. 2 (Abstract), Line 12 Delete "device, in" and insert --device to--, therefor.

In the Drawings

Sheet 11 of 14 (Reference Numeral 1120) (Fig. 11), Line 3 Delete "PEROID" and insert --PERIOD--, therefor.

In the Specification

In Column 1 Line 64 After "providing" insert --a--.

In Column 1 Line 66 Delete "all" and insert --an--, therefor.

In Column 1 Line 66-67 Delete "low in" and insert --low. In--, therefor.

In Column 2 Line 12 Delete "hit" and insert --bit--, therefor.

In Column 2 Line 14 Delete "bath" and insert --both--, therefor.

In Column 2 Line 19 Delete "poise" and insert --pulse--, therefor.

In Column 2 Line 47 Delete "hits" and insert --bits--, therefor.

In Column 3 Line 66 Delete "a 31)" and insert --a--, therefor.

In Column 4 Line 30 Delete "anon-inverted" and insert --a non-inverted--, therefor.

In Column 4 Line 65 Delete "all" and insert --an--, therefor.

In Column 5 Line 44 Delete "hit" and insert --bit--, therefor.

In Column 5 Line 66 Delete "data," and insert --data--, therefor.

In Column 6 Line 16 Delete "hit" and insert --bit--, therefor.

In Column 7 Line 35 Delete "hit" and insert --bit--, therefor.

Signed and Sealed this
Third Day of March, 2015

Michelle K. Lee
*Deputy Director of the United States Patent and Trademark Office*

CERTIFICATE OF CORRECTION (continued)
U.S. Pat. No. 8,861,666 B2

In Column 8 Line 5 Delete "au" and insert --an--, therefor.

In Column 8 Line 43 Delete "hit" and insert --bit--, therefor.

In Column 8 Line 56 Delete "hit" and insert --bit--, therefor.

In Column 8 Line 57 Delete "clock/dam" and insert --clock/data--, therefor.

In Column 9 Line 29 Delete "hits" and insert --bits--, therefor.

In Column 9 Line 42 Delete "hits" and insert --bit--, therefor.

In Column 10 Line 8 Delete "roaster" and insert --master--, therefor.

In Column 10 Line 16 Delete "h" and insert --$t_2$--, therefor.

In Column 11 Line 13 Delete "lime" and insert --time--, therefor.

In Column 13 Line 45 Delete "lime" and insert --time--, therefor.

In Column 13 Line 57 Delete "hit" and insert --bit--, therefor.

In the Claims

In Column 15 Line 11 In Claim 7, Delete "producing," and insert --producing--, therefor.

In Column 16 Line 32 (Approx.) In Claim 12, after "wherein" insert --the--.